(12) United States Patent
Dong et al.

(10) Patent No.: US 11,989,205 B2
(45) Date of Patent: May 21, 2024

(54) DATA REPLICATION IN AN ACTIVE-ACTIVE DATABASES

(71) Applicant: International Business Machines Corporation, Armonk, NY (US)

(72) Inventors: Xin Xin Dong, Beijing (CN); Mai Zeng, Beijing (CN); Xing Jun Zhou, Shanghai (CN); Ming Qiao Shang Guan, Beijing (CN); Wei Song, Beijing (CN); Cheng Fang Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 17/805,048

(22) Filed: Jun. 2, 2022

(65) Prior Publication Data
US 2023/0394062 A1 Dec. 7, 2023

(51) Int. Cl.
*G06F 16/27* (2019.01)
(52) U.S. Cl.
CPC .................................. *G06F 16/27* (2019.01)
(58) Field of Classification Search
CPC ........................................................ G06F 16/27
USPC ........................................................ 707/634
See application file for complete search history.

(56) References Cited

U.S. PATENT DOCUMENTS

| | | | | |
|---|---|---|---|---|
| 9,009,480 B1* | 4/2015 | Wu | ........................ | H04L 63/045 713/171 |
| 2007/0136389 A1* | 6/2007 | Bergant | .............. | H04L 67/1095 |
| 2014/0280398 A1* | 9/2014 | Smith | ................... | H04L 69/326 707/825 |
| 2015/0254298 A1* | 9/2015 | Bourbonnais | ......... | G06F 16/273 707/610 |
| 2017/0039261 A1* | 2/2017 | Bourbonnais | ....... | G06F 11/1464 |

(Continued)

FOREIGN PATENT DOCUMENTS

CN 109446212 B 8/2020

OTHER PUBLICATIONS

Gong, Li. A security risk of depending on synchronized clocks. ACM SIGOPS Operating Systems Review, vol. 26, Issue 1, pp. 49-53. Published Jan. 1992. Accessed Sep. 27, 2023 from <https://doi.org/10.1145/130704.130709> (Year: 1992).*

*Primary Examiner* — Robert W Beausoliel, Jr.
*Assistant Examiner* — Lauren Zannah Ganger
(74) *Attorney, Agent, or Firm* — CANTOR COLBURN LLP; Kelsey M. Skodje

(57) ABSTRACT

Embodiments of the invention are directed to data replication in an active-active databases having a source site and a target site. Aspects include creating a subscription activation message in a capture address space, the subscription activation message having a timestamp after a latest committed timestamp of the active-active databases and transmitting the subscription activation message to a subscription activation module of the target site of the active-active databases. Based on a determination that one or more tables associated with the subscription activation message are inactive, aspects also include repairing the one or more tables. Based on a determination that all tables associated with the subscription activation message are active, aspects include initiate replication of the capture address space from the source site to the target site with a timestamp of the latest committed timestamp.

14 Claims, 7 Drawing Sheets

| SUB_ID | OWNER | TBNAME | STATE | REASON |
|---|---|---|---|---|
| 105 | BKCNK | TBMPTXNO | I | ASN0963E COLUMN TXNO_TXN_LCL_TM MISSING |
| 209 | BNCNK | TBMNCLTO | I | ASN0963E COLUMN CLTO_PART_ID MISSING |
| 2509 | BKCNK | TBMFITZO | I | ASN0973E ITZO_TXN_INSID COLUMN TYPE MISMATCH |

600
602  604  606  608  610

(56) References Cited

U.S. PATENT DOCUMENTS

| | | |
|---|---|---|
| 2018/0203913 A1 | 7/2018 | Bourbonnais et al. |
| 2019/0266276 A1 | 8/2019 | Patel et al. |
| 2021/0056119 A1* | 2/2021 | Majmudar ............ G06F 16/273 |

* cited by examiner

| SUB_ID | OWNER | TBNAME | STATE | REASON |
|---|---|---|---|---|
| 105 | BKCNK | TBMPTXN0 | I | ASN0963E COLUMN TXN0_TXN_LCL_TM MISSING |
| 209 | BNCNK | TBMNCLT0 | I | ASN0963E COLUMN CLT0_PART_ID MISSING |
| 2509 | BKCNK | TBMFITZ0 | I | ASN0973E ITZ0_TXN_INSID COLUMN TYPE MISMATCH |

FIG. 6

DATA REPLICATION IN AN ACTIVE-ACTIVE DATABASES

BACKGROUND

The present invention generally relates to database replication, and more specifically, to data replication in an active-active databases having a source site and a target site.

Most modern-day database systems employ database replication to ensure that critical databases provide redundancy to protect against the loss of data and to maintain the accessibility of the database. Database replication is the frequent copying of data from one database on one computer or server to another database on another computer or server. Database replication ensures that the failure of the computer or server will not result in the loss of the data stored in the database or a loss of accessibility to the database.

While database replication provides improved accessibility and redundancy, it does so at the cost of increased storage requirements as the storage capacity required to provide database replication is multiple times the storage capacity needed to store a single copy of a database.

SUMMARY

Embodiments of the present invention are directed to a computer-implemented method for data replication in an active-active databases having a source site and a target site. A non-limiting example of the computer-implemented method includes creating, by a subscription activation module of the source site of the active-active databases, a subscription activation message in a capture address space, the subscription activation message having a timestamp after a latest committed timestamp of the active-active databases. The method also includes transmitting, by a subscription activation module of the source site of the active-active databases, the subscription activation message to a subscription activation module of the target site of the active-active databases. Based on a determination, by a subscription verification module of the source site and a subscription verification module of the target site, that one or more tables associated with the subscription activation message are inactive, the method includes repairing, by a subscription repair module, the one or more tables. Based on a determination, by the subscription verification module of the source site and the subscription verification module of the target site, that all tables associated with the subscription activation message are active, the method includes initiating replication of the capture address space from the source site to the target site with a timestamp of the latest committed timestamp.

Embodiments of the present invention are directed to a system for data replication in an active-active databases having a source site and a target site. A non-limiting example of the system includes a processor communicative coupled to a memory, the processor operable to create a subscription activation message in a capture address space, the subscription activation message having a timestamp after a latest committed timestamp of the active-active databases and transmit the subscription activation message to a subscription activation module of the target site of the active-active databases. Based on a determination that one or more tables associated with the subscription activation message are inactive, the processor is further operable to repair the one or more tables. Based on a determination that all tables associated with the subscription activation message are active, the processor is further operable to repair initiate replication of the capture address space from the source site to the target site with a timestamp of the latest committed timestamp.

Embodiments of the invention are directed to a computer program product for data replication in an active-active databases having a source site and a target site, the computer program product comprising a computer readable storage medium having program instructions embodied therewith. The program instructions are executable by a processor to cause the processor to perform a method. A non-limiting example of the method includes creating, by a subscription activation module of the source site of the active-active databases, a subscription activation message in a capture address space, the subscription activation message having a timestamp after a latest committed timestamp of the active-active databases. The method also includes transmitting, by a subscription activation module of the source site of the active-active databases, the subscription activation message to a subscription activation module of the target site of the active-active databases. Based on a determination, by a subscription verification module of the source site and a subscription verification module of the target site, that one or more tables associated with the subscription activation message are inactive, the method includes repairing, by a subscription repair module, the one or more tables. Based on a determination, by the subscription verification module of the source site and the subscription verification module of the target site, that all tables associated with the subscription activation message are active, the method includes initiating replication of the capture address space from the source site to the target site with a timestamp of the latest committed timestamp.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts an inactive subscription table according to embodiments of the invention.

Figure 1:
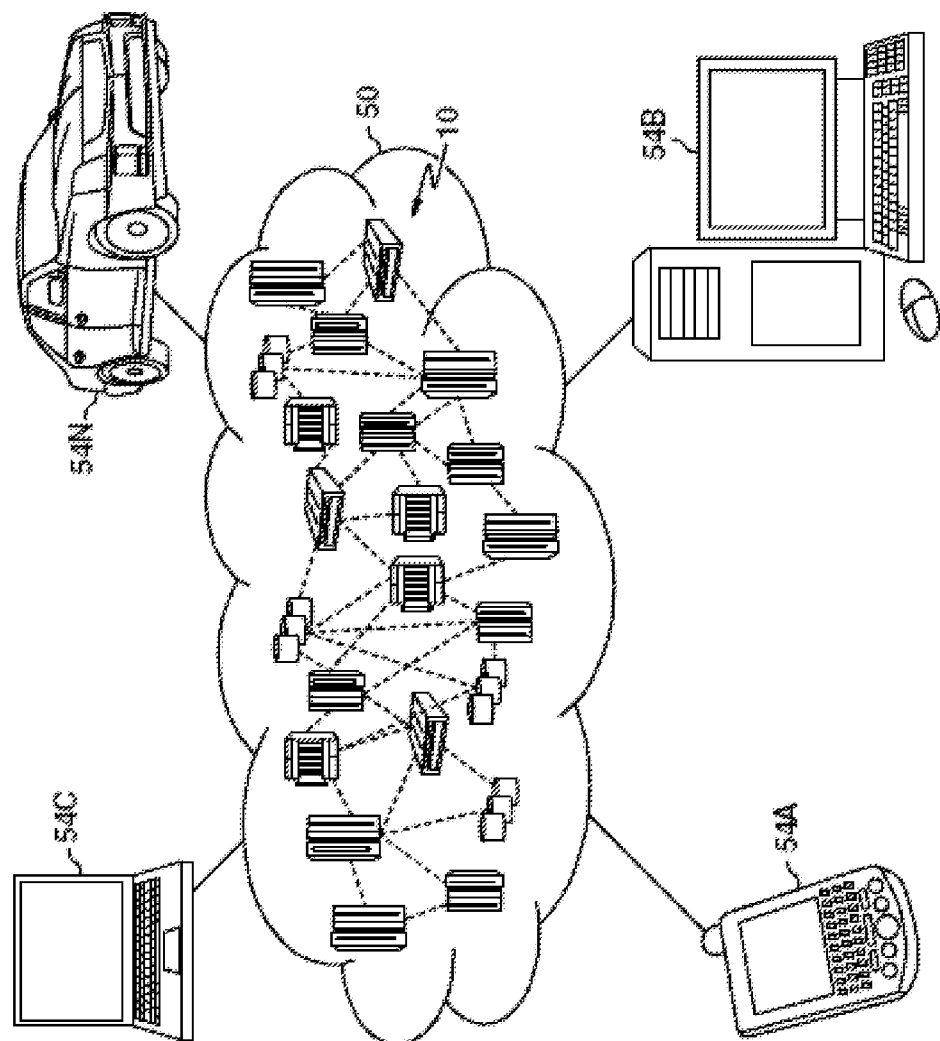
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, database replication is often used to provide redundancy to protect against the loss of data and to maintain the accessibility of the database. A typical database replication system utilizes multiple copies of a database to achieve redundancy and accessibility goals. Redundant database systems are classified as either active-active or active-passive databases. Active-active databases architectures provide access to the resources of servers at both sites during normal operation. In contrast, in an active-passive database architecture, the servers at the backup site are only utilized during a failover condition. In active-active databases architectures, software data replication tools are utilized to ensure data consistency in both active sites.

The data sets (i.e., tables) that support a specific application are organized and mapped to what is referred to herein as a subscription, which is a combination of source data sets, user-configurable memory caches, and communication paths in the active-active databases system. Because of its autonomous structure, replication can be started, stopped, and maintained for a subscription independently of other subscriptions. In exemplary embodiments, when a data replication process begins for a replication address space, the data replication process activates the subscriptions to capture the log update, publish it into the message queues and apply the transactions to the target site. However, when the subscribed tables run into any issue and fail to activate especially during the period of tables change and maintenance, the data replication will continue in the address space level and keep reading the log update without the deactivated subscriptions.

In exemplary embodiments, a data replication in an active-active databases having a source site and a target site is provided that is configured to verify the activation status of the replication subscriptions before reading DBMS logs and applying replays of the transaction of the activated subscriptions on the target site to ensure data consistency between the source and target sites.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
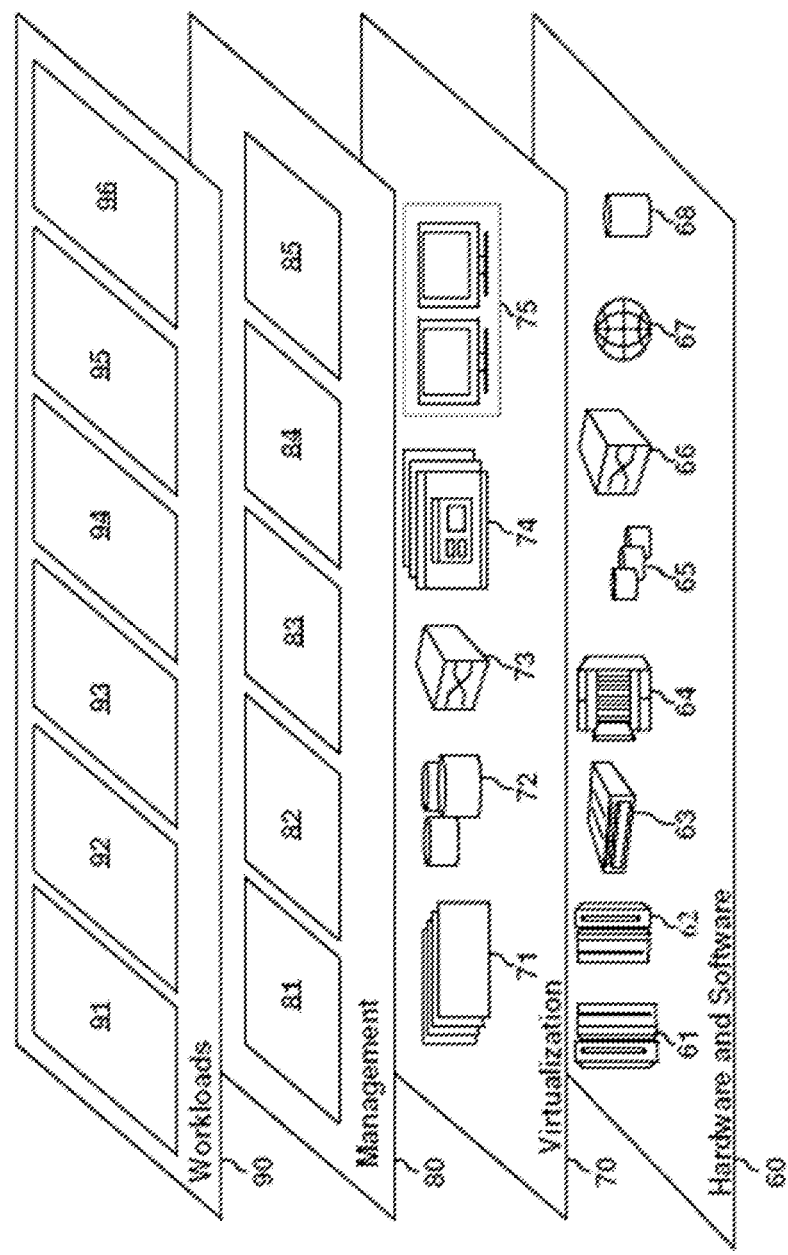
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database replication 96.

Figure 3:
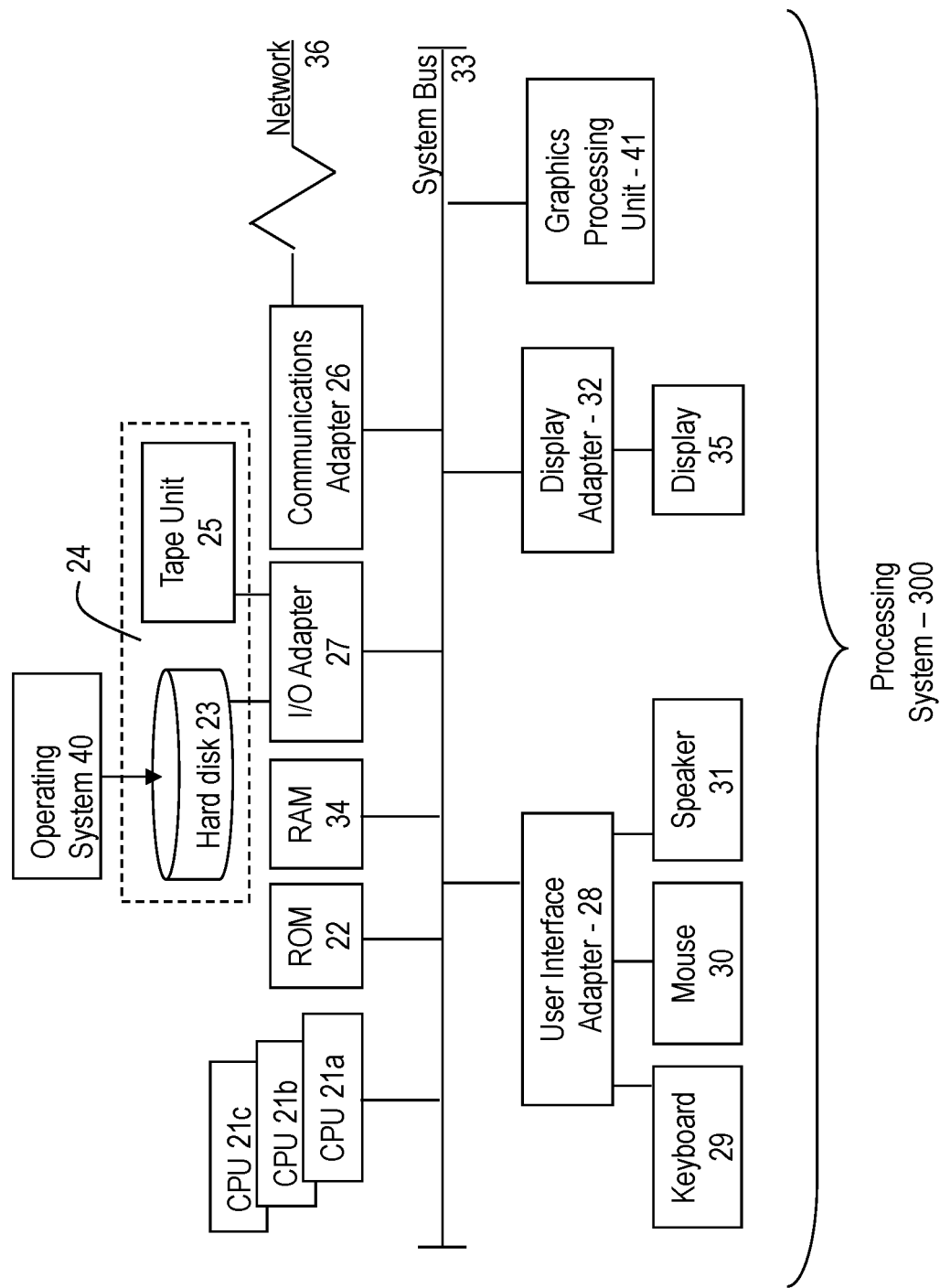
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to an overview of technologies that are more specifically relevant to aspects of the invention, methods, systems, and computer program products for data replication in an active-active databases having a source site and a target site are provided. In exemplary embodiments, the methods, systems, and computer program products for replication of a database from a source site to a target site in an active-active databases architecture are provided. In exemplary embodiments, the replication of a database from a source site to a target site is configured to verify an activation status of a replication subscription before reading DBMS logs and applying replays of the transactions of the activated subscriptions on target sites to ensure data consistency between the source and target sites.

In exemplary embodiments, a subscription activation module of the source site creates a subscription activation message that prompts subscription verification modules on the source site and on the target site to verify that all datasets (i.e., tables) associated with the subscription are active. Upon determination that one or more tables associated with a subscription are inactive, a subscription repair module is configured to repair the tables before the primary site reading DBMS logs and applying replays of the transaction of the activated subscriptions on target sites.

Figure 4:
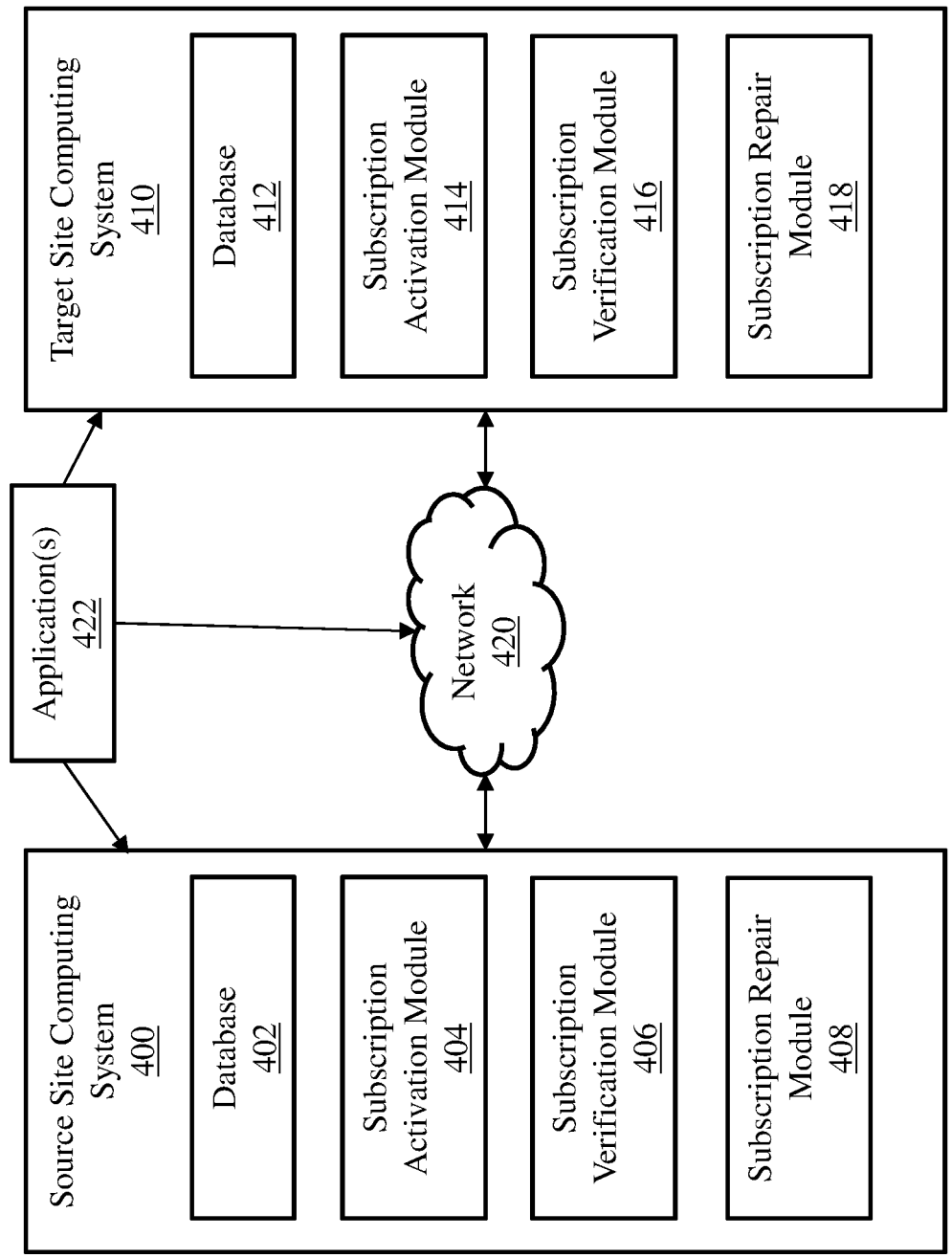
FIG. 4 depicts a block diagram of a system for data replication in an active-active databases having a source site and a target site according to embodiments of the invention.

Turning now to a more detailed description of aspects of the present invention, FIG. 4 depicts a system for data replication in an active-active databases having a source site and a target site according to embodiments of the invention. The system includes a source site computing system 400 and a target site computing system 410 that communicate with one another via a network 420. In addition, both the source site computing system 400 and a target site computing system 410 are configured to receive data from one or more applications 422, either directly or via network 420. One or more of the computing systems 400 and 410 can be implemented on the processing system 300 found in FIG. 3. Additionally, the cloud computing system 50 can be in wired or wireless electronic communication with one or all of the elements of the computing systems 400, 410, 420, 430. Cloud 50 can supplement, support, or replace some or all of the functionality of the elements of the computing systems 400 and 410. Additionally, some or all of the functionality of the elements of computing systems 400 and 410can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

As illustrated, the source site computing system 400 includes a database 402, a subscription activation module 404, a subscription verification module 406, and a subscription repair module 408. Likewise, the target site computing system 410 includes a database 412, a subscription activation module 414, a subscription verification module 416, and a subscription repair module 418.

In exemplary embodiments, a database 402 is maintained by the source computing system 400, which utilizes a database replication system to ensure the availability and redundancy of the database 402 with the database 412 maintained by the target computing system 410. In exemplary embodiments, the target computing system 410 is configured to store a database 412, which is a duplicate of the database 402. Since both the source site computing system 400 and a target site computing system 410 are active sites, both computing systems 400, 410 can respectively receive updates to databases 402, 412 from one or more applications 422. Once one of the source site computing system 400 and a target site computing system 410 receives an update to their respective database 402, 412, these updates are replicated to the database 402, 412 of the other computing system 400, 410. In exemplary embodiments, each application 422 is associated with a subscription, which identifies tables stored in databases 402, 412 that correspond to the application 422.

In exemplary embodiments, the subscription activation modules 404, 414 are configured to, respectively, activate a subscription in each one of the source site computing system 400 and the target site computing system 410 by creating a subscription activation message that is provided to the subscription verification modules 406, 416. In exemplary embodiments, the subscription activation message is created by one of the subscription activation modules 404, 414 and placed in a capture address space of a first active site, the subscription activation message includes a timestamp after a latest committed timestamp of the active-active databases. The subscription activation message includes an identification of the subscription, which identifies tables stored in databases 402, 412 that correspond to the subscription. Once the subscription activation message is placed in the capture address space of the first active site, it is captured and placed in a publish message queue to be transmitted to the other active site. Once received by the other active site, the subscription activation message is placed in an apply address space of the other active site and the subscription activation message, which activates corresponding subscriptions in the other active site.

In one embodiment, the subscription activation message is created in response to a user command to verify replication subscriptions in the active-active databases. The user command may be received by either the source site computing system 400 or the target site computing system 410. In another embodiment, the subscription activation message is created periodically by an optimization utility of the active-active databases to verify replication subscriptions in the active-active databases. The subscription activation message may be created by either the source site computing system 400 or the target site computing system 410.

In exemplary embodiments, the subscription verification modules 406, 416 are configured to verify whether all the tables associated with the subscription in the subscription activation message are activated, respectively on both source site computing system 400 and the target site computing system 410. In exemplary embodiments, the subscription verification modules 406, 416 are configured to check whether all the tables associated with the subscription identified in the subscription activation message are activated successfully. In one embodiment, the subscription verification modules 406, 416 are configured to check a count of active tables associated with the subscription and to store table definitions for tables determined to be inactive in an inactive subscription table. The inactive subscription table includes an inactive subscription number, an inactive subscription table name, and a root cause why inactive subscription table could not be activated.

In exemplary embodiments, the subscription repair modules 408, 418 are configured to repair inactive tables associated with the subscription in both the source site computing system 400 and the target site computing system 410, respectively. In exemplary embodiments, the subscription repair modules 408, 418 retries the activation of the subscription until all the tables associated with the subscriptions become active in both the source site computing system 400 and the target site computing system 410.

In one embodiment, when an inactive table associated with the subscription is identified, the subscription definition is regenerated. Next, the subscription repair modules 408, 418 reinitialize the activation for the inactive subscription with the newly generated subscription definitions and retries the activation of the subscription. After all the subscriptions are active in both the source site computing system 400 and the target site computing system 410, replication of the capture address space from a source site to the target site is initiated beginning with items in the capture address space with a timestamp of the latest committed timestamp.

Figure 5:
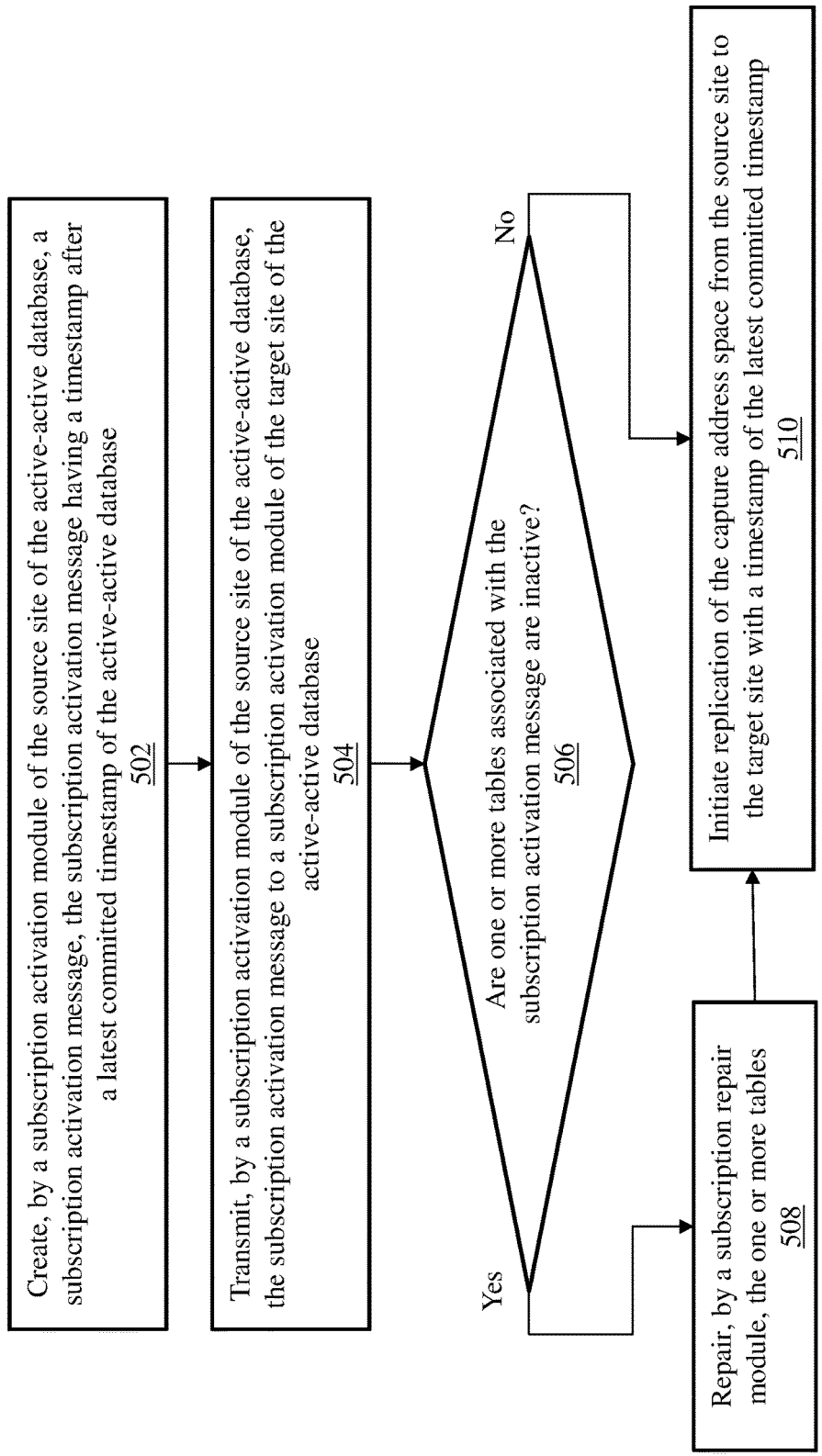
FIG. 5 depicts a flow diagram of a method for data replication in an active-active databases having a source site and a target site according to one or more embodiments of the invention.

FIG. 5 depicts a flow diagram of a method 500 for data replication in an active-active databases having a source site and a target site according to one or more embodiments of the invention. The method 500 includes creating, by a subscription activation module of the source site of the active-active databases, a subscription activation message, the subscription activation message having a timestamp after the latest committed timestamp of the active-active databases. In one embodiment, the timestamp is configured to be one day after the latest committed timestamp of the active-active databases. In another embodiment, the timestamp is configured to be at least five minutes after the latest committed timestamp of the active-active databases In one embodiment, the subscription activation message is created in response to a user command to verify replication subscriptions in the active-active databases. In another embodiment, the subscription activation message is created periodically by an optimization utility of the active-active databases to verify replication subscriptions in the active-active databases.

Next, as shown at block 504, the method 500 includes transmitting, by a subscription activation module of the source site of the active-active databases, the subscription activation message to a subscription activation module of the target site of the active-active databases. As shown at decision block 506, the method 500 includes determining whether one or more tables associated with the subscription activation message are inactive. If one or more tables associated with the subscription activation message are inactive, the method 500 proceeds to block 508 and includes repairing, by a subscription repair module, the one or more tables. In one embodiment, repairing the one or more tables includes generating a repair script for each of the entries of the inactive subscription tables. Once all of the tables of the subscription are active, the method 500 proceeds to block 510 and initiates replication of a capture address space from the source site to the target site with a timestamp of the latest committed timestamp.

In exemplary embodiments, based on the determination that one or more tables associated with the subscription activation message are inactive the method also includes creating an inactive subscription table 600, as shown in FIG. 6, by a subscription verification module of the source site and the subscription verification module of the target site. As illustrated, the subscription table 600 includes a plurality of entries that each corresponds to a table, each entry includes a subscription number 602 associated with the table, an identification of an owner 604 of the table, a table name 606, a state 608, and a root cause 610, which indicates why the table could not be activated.

Figure 7:
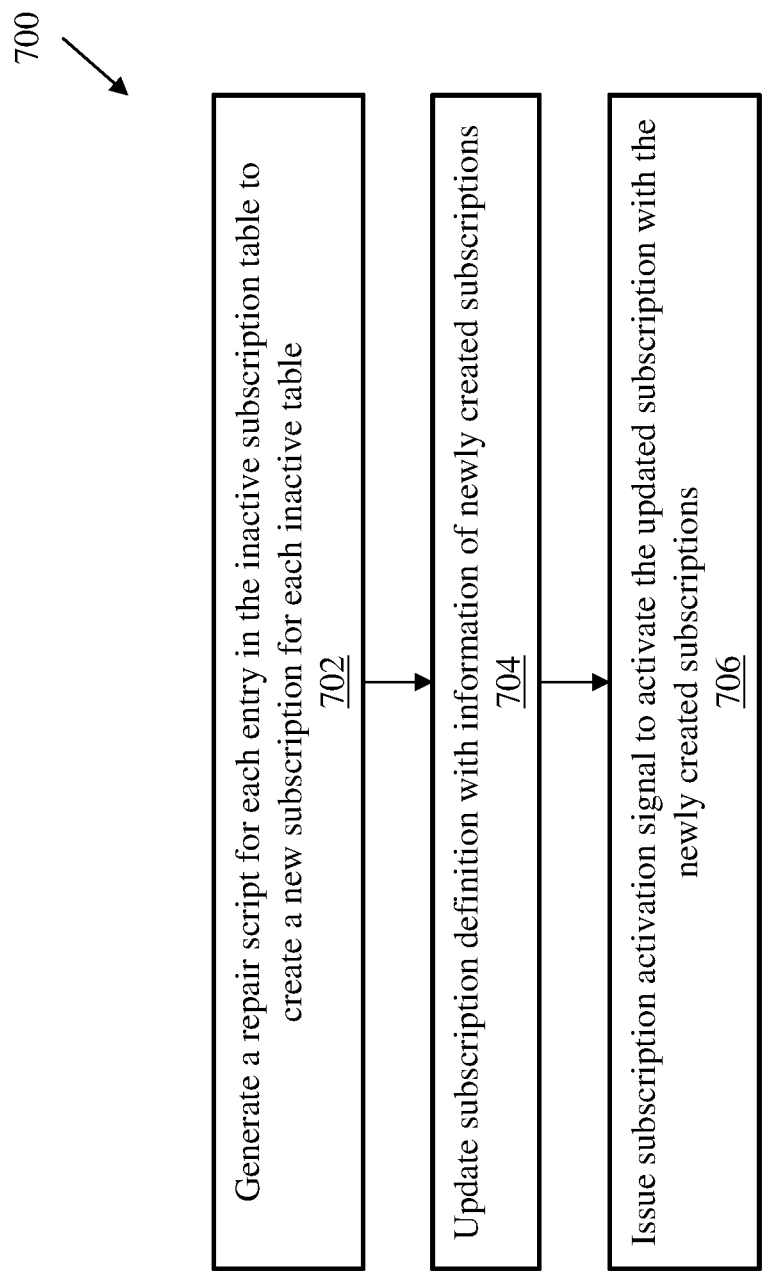
FIG. 7 depicts a flow diagram of a method for repairing one or more inactive tables by a subscription repair module according to one or more embodiments of the invention.

Referring now to FIG. 7, a flow diagram of a method 700 for repairing one or more inactive tables by a subscription repair module according to one or more embodiments of the invention. As shown at block 702, the method 700 includes generating a repair script for each entry in the inactive subscription table to create a new subscription for each inactive table. Next, as shown at block 704, the method includes updating a subscription definition with information of newly created subscriptions. The method 700 also includes issuing a subscription activation signal to activate the updated subscription with the newly created subscriptions, as shown at block 706.

Technical benefits of data replication in an active-active databases having a source site and a target site include providing systems, methods and computer program products to ensure all subscriptions activated and ready for data replication prior to beginning replication. By ensuring all subscriptions activated and ready for data replication prior to beginning replication data loss and/or data inconsistency caused by deactivated subscriptions in active-active databases can be avoided.

Additional processes may also be included. It should be understood that the processes depicted in FIGS. 5 and 7 represent illustrations and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for data replication in an active-active databases having a source site and a target site, the method comprising:
creating, by a subscription activation module of the source site of the active-active databases, a subscription activation message in a capture address space, the subscription activation message having a timestamp after a latest committed timestamp of the active-active databases;
transmitting, by a subscription activation module of the source site of the active-active databases, the subscription activation message to a subscription activation module of the target site of the active-active databases;
based on a determination, by a subscription verification module of the source site and a subscription verification module of the target site, that one or more tables associated with the subscription activation message are inactive, repairing, by a subscription repair module, the one or more tables;
based on a determination, by the subscription verification module of the source site and the subscription verification module of the target site, that all tables associated with the subscription activation message are active, initiating replication of the capture address space from the source site to the target site with a timestamp of the latest committed timestamp; and
creating an inactive subscription table, by the subscription verification module of the source site and the subscription verification module of the target site, based on the determination that one or more subscriptions associated with the subscription activation message are inactive, wherein each entry of the inactive subscription table includes a subscription number, a table name, and a root cause why an inactive table could not be activated.

2. The method of claim 1, wherein the timestamp is configured to be at least five minutes after the latest committed timestamp of the active-active databases.

3. The method of claim 1, wherein the subscription activation message is created in response to a user command to verify replication subscriptions in the active-active databases.

4. The method of claim 1, wherein repairing, by the subscription repair module, the one or more tables includes generating a repair script for each of the entries of the inactive subscription table.

5. The method of claim 1, wherein the subscription activation message is created periodically by an optimization utility of the active-active databases to verify replication subscriptions in the active-active databases.

6. A system for data replication in an active-active databases having a source site and a target site, the system comprising:
a processor communicatively coupled to a memory, the processor configured to:
create a subscription activation message in a capture address space, the subscription activation message having a timestamp after a latest committed timestamp of the active-active databases;
transmit the subscription activation message to a subscription activation module of the target site of the active-active databases;
based on a determination that one or more tables associated with the subscription activation message are inactive, repair the one or more tables;
based on a determination that all tables associated with the subscription activation message are active, initiate replication of the capture address space from the source site to the target site with a timestamp of the latest committed timestamp; and
create an inactive subscription table, by the subscription verification module of the source site and the subscription verification module of the target site, based on the determination that one or more subscriptions associated with the subscription activation message are inactive, wherein each entry of the inactive subscription table includes a subscription number, a table name, and a root cause why an inactive table could not be activated.

7. The system of claim 6, wherein the timestamp is configured to be at least five minutes after the latest committed timestamp of the active-active databases.

8. The system of claim 6, wherein the subscription activation message is created in response to a user command to verify replication subscriptions in the active-active databases.

9. The system of claim 6, wherein repairing the one or more tables includes generating a repair script for each of the entries of the inactive subscription table.

10. The system of claim 6, wherein the subscription activation message is created periodically by an optimization utility of the active-active databases to verify replication subscriptions in the active-active databases.

11. A computer program product for data replication in an active-active databases having a source site and a target site comprising a computer readable storage medium having program instructions embodied therewith, the program instructions executable by a processor to cause the processor to perform a method comprising:
creating, by a subscription activation module of the source site of the active-active databases, a subscription activation message in a capture address space, the subscription activation message having a timestamp after a latest committed timestamp of the active-active databases;
transmitting, by a subscription activation module of the source site of the active-active databases, the subscription activation message to a subscription activation module of the target site of the active-active databases;
based on a determination, by a subscription verification module of the source site and a subscription verification module of the target site, that one or more tables associated with the subscription activation message are inactive, repairing, by a subscription repair module, the one or more tables; and
based on a determination, by the subscription verification module of the source site and the subscription verification module of the target site, that all tables associated with the subscription activation message are active, initiating replication of the capture address space from the source site to the target site with a timestamp of the latest committed timestamp; and
creating an inactive subscription table, by the subscription verification module of the source site and the subscription verification module of the target site, based on the determination that one or more subscriptions associated with the subscription activation message are inactive, wherein each entry of the inactive subscription table includes a subscription number, a table name, and a root cause why an inactive table could not be activated.

12. The computer program product of claim 11, wherein the timestamp is configured to be at least five minutes after the latest committed timestamp of the active-active databases.

13. The computer program product of claim 11, wherein the subscription activation message is created in response to a user command to verify replication subscriptions in the active-active databases.

14. The computer program product of claim 11, wherein repairing, by the subscription repair module, the one or more tables includes generating a repair script for each of the entries of the inactive subscription table.

* * * * *